United States Patent
Hirsh et al.

[11] Patent Number: 5,943,198
[45] Date of Patent: *Aug. 24, 1999

[54] ELECTRICAL FAULT INTERRUPT CIRCUITS

[75] Inventors: Stanley S. Hirsh, El Paso, Tex.; David C. Nemir, 1221 Baltimore Ave., El Paso, Tex. 79902

[73] Assignee: David C. Nemir, El Paso, Tex.

[ * ] Notice: This patent is subject to a terminal disclaimer.

[21] Appl. No.: 08/799,919

[22] Filed: Feb. 13, 1997

Related U.S. Application Data

[63] Continuation of application No. 08/453,664, May 26, 1995, abandoned.

[51] Int. Cl.⁶ .................................................. H02H 3/00
[52] U.S. Cl. ............................ 361/42; 361/49; 361/103
[58] Field of Search .................................. 361/42, 45, 49, 361/103

[56] References Cited

U.S. PATENT DOCUMENTS

| | | | |
|---|---|---|---|
| 2,061,347 | 11/1936 | Coe | 177/311 |
| 3,252,052 | 5/1966 | Nash | 317/18 |
| 3,313,960 | 4/1967 | Borys | 307/127 |
| 3,600,635 | 8/1971 | Neilson | 317/33 SC |
| 3,806,845 | 4/1974 | Zubaty et al. | 335/18 |
| 3,872,355 | 3/1975 | Klein et al. | 317/18 D |
| 3,936,699 | 2/1976 | Adams | 317/18 D |
| 3,970,975 | 7/1976 | Gryctko | 335/18 |
| 3,997,818 | 12/1976 | Bodkin | 317/33 SC |
| 4,029,996 | 6/1977 | Miffitt | 307/326 |
| 4,031,431 | 6/1977 | Gross | 307/326 |
| 4,040,117 | 8/1977 | Houser | 361/33 |
| 4,042,967 | 8/1977 | Yamamoto | 361/45 |
| 4,091,434 | 5/1978 | Suzuki et al. | 361/100 |
| 4,216,515 | 8/1980 | Van Zeeland | 361/45 |
| 4,347,540 | 8/1982 | Gray et al. | 361/47 |
| 4,353,103 | 10/1982 | Whitlow | 361/45 |
| 4,464,582 | 8/1984 | Aragaki et al. | 307/118 |
| 4,520,417 | 5/1985 | Frank | 361/45 |

(List continued on next page.)

*Primary Examiner*—Sally C Medley
*Attorney, Agent, or Firm*—Jeffrey D. Myers

[57] ABSTRACT

A circuit for the avoidance of electrical shock and burns in an electrical appliance. Designed primarily for a two wire appliance, the device consists of a conditioning circuit at the load and a fault sensor/interrupter at the plug. The conditioning circuit halts the flow of current to the load for a portion of each cycle of an AC excitation. If current flow is detected at the plug during this time interval it is indicative of a fault condition and a circuit breaker at the plug is opened. A fault is detected if one of the following conditions occurs: 1) a resistive path is established between hot to ground; 2) a load other than the conditioned load is placed between hot and neutral; and 3) an overtemperature condition is detected at the load. The circuit is self-resetting so that in the absence of a hot to ground fault, hot to neutral fault, or overtemperature condition, electrical current is allowed to flow.

27 Claims, 8 Drawing Sheets

U.S. PATENT DOCUMENTS

| | | | |
|---|---|---|---|
| 4,577,094 | 3/1986 | Mills | 219/505 |
| 4,639,817 | 1/1987 | Cooper et al. | 361/62 |
| 4,649,454 | 3/1987 | Winterton | 361/50 |
| 4,658,322 | 4/1987 | Rivera | 361/37 |
| 4,707,759 | 11/1987 | Bodkin | 361/48 |
| 4,734,843 | 3/1988 | Beddoe et al. | 363/50 |
| 4,751,603 | 6/1988 | Kwan | 361/42 |
| 4,763,365 | 8/1988 | Gerondale et al. | 4/542 |
| 4,797,772 | 1/1989 | Kaplanis | 361/42 |
| 4,802,052 | 1/1989 | Brant et al. | 361/42 |
| 4,829,390 | 5/1989 | Simon | 361/49 |
| 4,843,514 | 6/1989 | Bodkin | 361/50 |
| 4,853,822 | 8/1989 | Kamijo | 361/100 |
| 4,858,054 | 8/1989 | Franklin | 361/57 |
| 4,860,147 | 8/1989 | Fai | 361/50 |
| 4,878,144 | 10/1989 | Nebon | 361/96 |
| 4,903,162 | 2/1990 | Kopelman | 361/103 |
| 4,912,588 | 3/1990 | Thome | 361/45 |
| 4,931,893 | 6/1990 | Glennon et al. | 361/45 |
| 4,931,894 | 6/1990 | Legatti | 361/45 |
| 4,954,922 | 9/1990 | Gaus et al. | 361/42 |
| 4,979,070 | 12/1990 | Bodkin et al. | 361/42 |
| 5,047,724 | 9/1991 | Boksiner et al. | 324/520 |
| 5,109,315 | 4/1992 | Morse | 361/42 |
| 5,124,646 | 8/1992 | Nachtigall | 361/42 |
| 5,148,344 | 9/1992 | Rao et al. | 361/42 |
| 5,159,517 | 10/1992 | Bodkin | 361/49 |
| 5,166,853 | 11/1992 | Gershen et al. | 361/50 |
| 5,184,271 | 2/1993 | Doyle et al. | 361/49 |
| 5,185,584 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,200,873 | 4/1993 | Glennon | 361/45 |
| 5,206,595 | 4/1993 | Wiggins et al. | 324/535 |
| 5,206,596 | 4/1993 | Beihoff et al. | 324/536 |
| 5,208,542 | 4/1993 | Tennies et al. | 324/544 |
| 5,223,795 | 6/1993 | Blades | 324/536 |
| 5,224,006 | 6/1993 | MacKenzie et al. | 361/45 |
| 5,280,404 | 1/1994 | Ragsdale | 361/113 |
| 5,353,185 | 10/1994 | Bodkin | 361/49 |
| 5,394,289 | 2/1995 | Yao et al. | 361/42 |
| 5,420,740 | 5/1995 | MacKenzie et al. | 361/45 |
| 5,477,412 | 12/1995 | Neiger et al. | 361/45 |

ELECTRICAL FAULT INTERRUPT CIRCUITS

This is a continuation of application Ser. No. 08/453,664 filed on May 26, 1995 now abandoned.

BACKGROUND OF THE INVENTION

1. Field of the Invention

This invention relates to appliance protection circuits that prevent electrical shock hazards arising from a hot to ground fault or a hot to neutral fault, and that further regulate temperature in the load.

2. Description of Prior Art

Any electrical device ("the load") requires the flow of electrical current in order to operate. An analogy is the flow of water through an aquarium filter. A pump takes in water from the aquarium and increases the pressure (analogous to an increase in electrical voltage) to force the water through a tube (the tube is analogous to the electrical conductor or wire) to the filter (analogous to the electrical load). The flow of water current through the tube is analogous to the flow of electrical current in a wire. Most of the water pressure is "used up" in passing through the filter so that the water coming out of the filter has a relatively low pressure. A hose conveys the low pressure water from the filter outlet back to the aquarium. If there is a hole in the tube connecting the pump and the filter then some of the water will go through this hole to pass from the high pressure in the tube to a lower pressure outside the tube. This constitutes a water leak.

In somewhat the same way, an electrical device or load receives electrical energy from one terminal of an electrical outlet or source (the so-called high voltage or "hot" side), electrical current flows to the device through an electrical conductor or wire (the hot conductor), this current passes through the load and is then returned to another terminal of the electrical outlet through another wire called the neutral wire. The neutral wire will have a very low voltage (electrical pressure) because most of the voltage will be "used up" in the act of forcing electrical current through the load.

The two wires that connect source and load may have a coating of rubber or some other electrical insulating material or they may be bare, in which case air, which is a good insulator, functions to inhibit electrical current flow outside of the wire. Since the human body presents a relatively low resistance to the flow of electrical current, if a person comes into contact with a high voltage object such as the hot conductor, while also making contact with a lower voltage object, then an electrical leakage current that is proportional to the voltage difference will flow through the person and may cause injury or death. If the lower voltage object that the person comes in contact with is electrically connected to the earth (ground) then this is called a hot to ground fault. If the lower voltage object that the person comes into contact with is the neutral wire, this is called a hot to neutral fault. If the person makes contact between the neutral wire and ground this is called a neutral to ground fault. Since the voltage difference between neutral and ground is generally small (because the neutral line is connected to ground at a breaker box), a neutral to ground fault is generally considered to be less hazardous than a hot to ground or a hot to neutral fault.

Electrical current is the flow of electrons. Since electrons are not created or destroyed, any functioning electrical appliance will require both an entry path and an exit path in order for electrical current to flow. In an electrical appliance, electrons may exclusively enter on one path and exit on a second (direct current or DC operation). For most household appliances that operate from a plug, electrons will sometimes enter path one and exit path two and sometimes enter path two and exit path one. This is known as alternating current or AC operation. A special case of AC operation is the so-called half wave AC (also known as pulsating DC) whereby over regularly repeating periods of time (or cycles), electrical current will flow in one direction for a portion of the cycle and will be blocked from flowing for another portion of the cycle. Although the direction of current flow in half wave AC operation is unidirectional, it is considered to be alternating current since the magnitude of the electrical current varies in a cyclical fashion.

A common source of electrical injuries in the home occurs when people place radios or similar electrical devices near their pool or bath tub while swimming or bathing. If the radio is knocked into the water, it can create electrical leakage current through the water to ground, in other words, a hot to ground fault. A hot to ground fault can also occur when a person touches an electrically hot conductor while standing on or touching a grounded conductive surface. When sufficient current passes through a person, electrical burns or electrocution may result. Many electrical appliances such as heaters, hair dryers, electric razors and pumps are used near water and present this type of hazard.

An additional hazard for the user of an electrical appliance occurs when the user comes into contact with both a hot and a neutral wire, establishing a path through the user's body for electrical current to flow. This is known as a hot to neutral fault and can lead to electrical burns and electrocution. A hot to neutral fault can occur when the cord on an appliance is broken or the insulation is frayed or otherwise damaged. A hot to neutral fault can also occur when a power hand tool or electrical lawn appliance comes into contact with and cuts the power cord.

The U.S. Consumer Product Safety Commission compiles annual estimates of injuries in the U.S. due to consumer products. For the year 1993, this organization estimates that there were over 8200 injuries due to electrical shock and over 8900 additional injuries due to electrical burns. The products in which these injuries occur are grouped in such diverse categories as extension cords (an estimated 129 shock and 481 electric burn injuries), power drills (an estimated 17 shock injuries) aquarium accessories (an estimated 112 shock injuries), Christmas tree lights (an estimated 69 shock and 34 electrical burn injuries) and hair dryers (an estimated 103 shock and 491 electrical burn injuries).

Protection circuits for hot to ground faults, commonly known as ground fault interrupters or GFI's, are presently required by code for the bathrooms of most new homes and commercial buildings. Such circuits are also required for Underwriter's Laboratories approval in hair dryers and are built into the plug of U.L. approved hair dryers. Of the GFI circuits presently available on the market, all use a current imbalance in a current sense transformer as the means of detecting a fault. Such circuits are described, for example, in U.S. Pat. Nos. 4,216,515 (Van Zeeland), 4,353,103 (Whitlow), 4,979,070 (Bodkin) and 5,200,873 (Glennon). None of these inventions will protect against a hot to neutral fault in the appliance wiring.

U.S. Pat. No. 3,997,818 (Bodkin) discloses a GFI circuit in which a silicon controlled rectifier (thyristor) is used for half wave loads, using a resistor/capacitor combination to implement phase control. During the 0 to 180 degree portion of the cycle, load current is blocked by an unfired thyristor and the gate controlling capacitor is in a discharged condition. If a fault is present during the first 180 degrees, the gate controlling capacitor is reversed charged through the fault resistance and will inhibit the triggering of the thyristor during the next half cycle. The problem with this approach is that in the absence of a fault it takes a significant amount of time to charge the capacitor sufficiently to fire the thyristor during the 180 to 360 degree interval and as a result, the load receives electrical current significantly less than 180 degrees (half) of each cycle. This invention (U.S. Pat. No. 3,997,818) is also said to work for full wave loads by using two of the half wave circuits, each tied to the same neutral connection. In the full wave implementation a three wire power cord is thus required between plug and the load with two of the wires being a hot and the third being a neutral.

A device called an immersion detection circuit interrupter (IDCI) detects the occurrence of electrical leakage due to water immersion and opens a circuit breaker, effectively protecting appliances such as hair dryers from hot to ground faults due to, for example, dropping a hair dryer into a bathtub. Such immersion protection devices are described in U.S. Pat. Nos. 4,159,517 (Bodkin) 4,797,772 (Kaplanis) and 5,184,271 (Doyle and Rivera). These immersion detection circuits require a three wire cord in order to protect against a hot to ground fault. In addition, they will not afford protection against a hot to neutral fault.

3. OBJECTS AND ADVANTAGES

The present invention has the following objects and advantages:

a) uses a two wire electrical cord connecting the appliance to the plug;

b) does not require a current sense transformer;

c) interrupts power to the appliance in less than one cycle from the occurrence of the fault;

d) electrical power is automatically restored to the device upon removal of the fault (auto-reset);

e) can detect and respond to a hot to ground fault;

f) can detect and respond to a hot to neutral fault;

g) can detect and respond to an overtemperature condition in the load;

h) can protect against unintentional immersion of the load in water;

i) can be built into a conventionally sized plug;

j) can be used to control power to the appliance using a low level artificial fault.

Further objects and advantages of the present invention will become apparent from a description of the drawings and ensuing description. None of the prior art patents described in section 2, either alone or in any appropriate combination, anticipates or renders the disclosed invention unpatentable.

SUMMARY OF THE INVENTION

This invention comprises a circuit interrupter for use in an alternating current (AC) system having one hot and one neutral connection (a two wire appliance). It is the principle objective of the invention to provide protection against a hot to ground fault and protection against a hot to neutral fault. It is another objective to provide protection against an overtemperature condition in the load. It is another objective to provide immersion protection in the load. It is another objective to provide a low current power switch which induces an artificial fault, thereby causing the interruption of appliance power at the plug.

The objectives of this invention are obtained by using a load conditioning circuit at the load and a fault sense/current interrupt circuit at the plug. The plug receives a sinusoidal alternating current (AC current) from a power delivery source or electrical outlet. Under normal operation, the load conditioning circuit blocks current to the load during a portion of the applied AC current cycle. If, during this time interval when the load conditioning unit is blocking load current, a hot to ground fault or a hot to neutral fault occurs, electrical current will flow at the plug even though no current flows through the load. This will be sensed by the fault sense circuitry in the plug, which in turn will interrupt current flow, removing power from the appliance and thus eliminating the shock hazard. In each subsequent AC cycle, the appliance and cord will be tested briefly to establish if a fault condition is still present. If a fault condition is still present, the current interrupt remains open. If the fault condition is no longer present, the current interrupt is closed and electrical energy is delivered to the appliance. In this way, the device is self resetting.

In addition to fault protection, this invention will also provide overtemperature protection in the load. This is done by using a diode, triac or other thermally sensitive element in the load conditioning unit. This thermally sensitive element will preferably have an electrical current leakage that increases with temperature, a common property of semiconductors. By an appropriate placement of the thermally sensitive element of the load conditioning unit, with an arbitrarily high temperature there will be a sufficient leakage to be recognized as a fault, in which case the current interrupter at the plug will be opened, removing energy from the load and allowing it to cool for a partial cycle. If on subsequent cycles, the thermally sensitive element in the load conditioning unit is still too hot, the circuit interrupter will remain open.

In addition to fault and overtemperature protection, this invention will protect against unintentional immersion of the load in a liquid. This is done by building the hot and neutral conductors into the load in such a way that upon immersion in a conductive liquid, a leakage current will be established between hot and neutral, to be recognized at the plug as a hot to neutral fault. Electrical current will then be interrupted at the plug until such time as the fault is removed.

In addition to fault, overtemperature and immersion protection, this invention can be used to turn an appliance off and on at the plug. This can be done by having a switch (or button) in the appliance or at the plug that induces a low level fault current. When the switch is turned off, the artificial fault is removed and power is automatically restored to the appliance. The advantage to using this for an ON/OFF switch is that the switch need not be sized to interrupt the possibly high level appliance current but need only be sized large enough to handle a low level (under 10 mA) intentional fault current. This switch or button could also be used to test the correct operation of the fault protection circuitry.

BRIEF DESCRIPTION OF THE DRAWINGS

The above mentioned and other features and objects of this invention and the manner of obtaining them will become more apparent and the invention itself will be better understood by reference to the following description of the embodiments of the invention taken together with the accompanying drawings, wherein.

LIST OF REFERENCE NUMERALS

Figure 1:
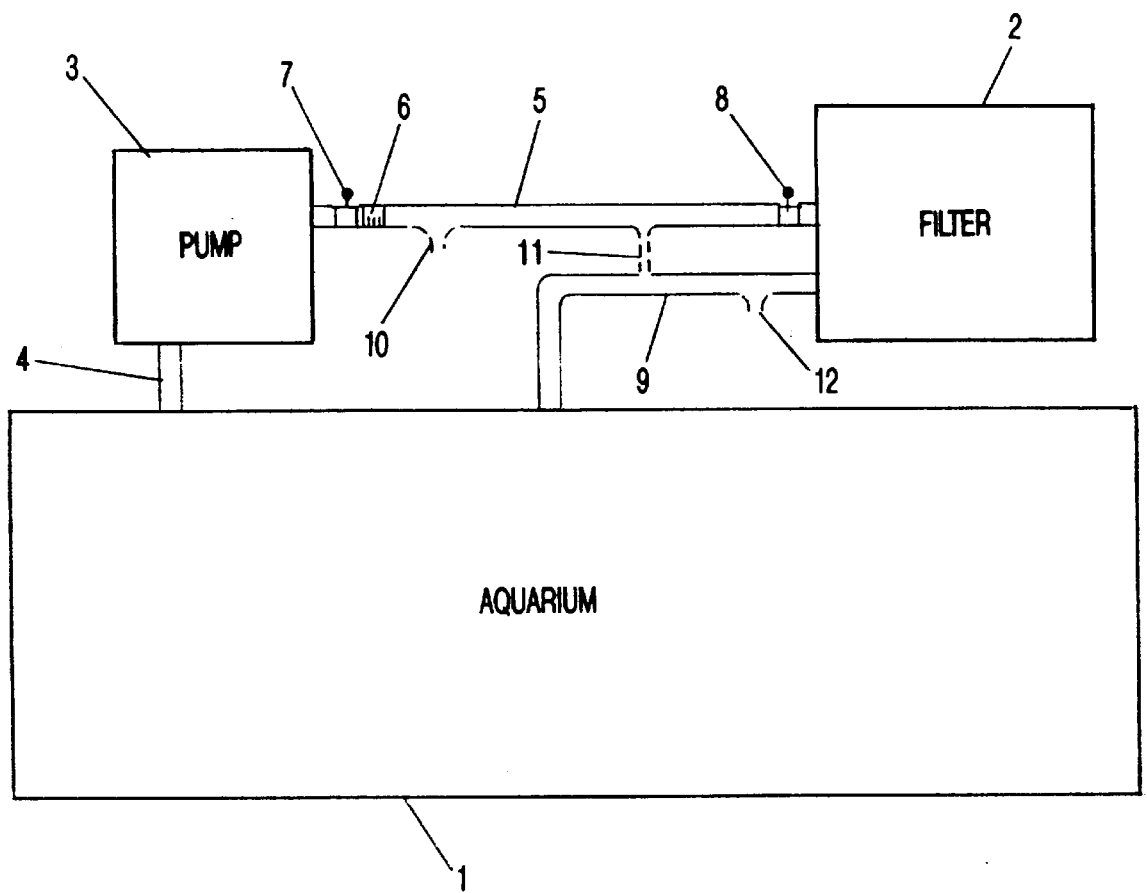
FIG. 1 depicts an aquarium pump/filter system which is analogous to the situation of sourcing electrical current to a load and furthermore depicting analogs of a hot-to-ground and a hot-to-neutral fault.

1 Aquarium
2 Filter
3 Pump
4 Intake hose connecting aquarium to pump
5 High pressure hose
6 Flowmeter
7 Pump outlet valve
8 Filter intake valve
9 Low pressure hose
10 Leak from high pressure hose to aquarium
11 Leak from high pressure hose to low pressure hose
12 Leak from low pressure hose to aquarium
13 Plug
14 Hot prong on plug
15 Neutral prong on plug
16 Hot side of line cord
17 Neutral side of line cord
18 Circuit breaker at plug on hot side
19 Circuit breaker at plug on neutral side
20 Conditioned load
21 Load conditioning circuit
22 Load
23 Fault detect/circuit breaker trigger circuit
24 Hot to neutral fault
25 Hot to ground fault
26 Charge storage capacitor
27 Resistor for charging capacitor
28 Trigger diac in plug
29 Current interrupting triac
30 Diac in load conditioning circuit
31 Load triac
32 Time interval in which current is blocked from flowing in the load
33 Negative half cycle
34 Positive half cycle
35 Ground
36,37 Voltage divider resistors
38 NPN darlington transistor
39 PNP darlington transistor
40 Current steering diodes
41 Intentional fault switch
42 Load conditioning diode
43 Current interrupt SCR
44 Intentional fault resistor
45 Gate capacitor
46 SCR gate resistor
47 Depletion mode MOSFET
48 Charge resistor
49 Gate protection zener diode
50 Charge resistor
51 Trigger current limiting resistor
52 Reverse blocking diode
53 Fault charging diode
54 Sensitive gate triac
55 Relay coil
56 Power diode
57 Enhancement mode MOSFET

DESCRIPTION OF THE PREFERRED EMBODIMENTS

In order to describe the functioning of the device, it is helpful to look at the analogous situation of an aquarium pump and filter combination. FIG. 1 depicts a situation where water is pumped from the aquarium 1 through a filter 2 and is then returned to the aquarium 1. The pump 3 takes low pressure water from the aquarium 1 using a hose 4 and increases the pressure so that the water flows in the high pressure hose 5 from the pump 3 to the filter 2 through the flowmeter 6, the pump outlet valve 7 and filter intake valve 8. The pump outlet valve 7 controls the flow of water out of the pump 3 while the filter intake valve 8 serves to allow or to block the flow of water into the filter 2. Both valves have only two possible positions, fully open and fully closed.

There is a pressure drop in the filter 2 so that water coming out of the filter 2 into the low pressure hose 9 has a low pressure. If a leak or hole 10 occurs between the high pressure hose 5 and the aquarium 1 then the pressure drop will be substantial and much water can flow out of the leak 10 instead of going through the desired path into the filter. If an identically sized leak 11 occurs between the high pressure hose 5 and the low pressure hose 9, then there can also be a significant flow of water passing through the leak and not taking the desired path through the filter 2. If an identically sized leak 12 occurs between the low pressure hose 9 and the aquarium 1, then there will not be as much water flowing out of this leak 12 because the pressure difference between the low pressure hose 9 and the aquarium 1 is smaller than the pressure difference between the high pressure hose 5 and the aquarium 1 or between the high pressure hose 5 and the low pressure hose 9.

Consider the flowmeter 6 installed at the outlet of the pump. This flowmeter 6 detects if any water is passing from the pump 3 into the high pressure hose 5. If pump outlet valve 7 is in an open position and filter intake valve 8 is in a closed position, then in the absence of a leak 11 from the high pressure hose 5 to the low pressure hose 9 or a leak 10 from the high pressure hose 5 to the aquarium 1, there will be no flow of water out of the pump 3 and the flowmeter 6 will not detect any flow of water. If, however, there are leaks 10 and/or 11 out of the high pressure hose 5, then there will be some water flowing out of the pump 3 into the high pressure hose 5. If this occurs, then the leaks 10,11 from the high pressure hose 5 may be halted by closing the pump outlet valve 7. In this way, the flowmeter 6 together with the filter intake valve 8 serve to detect the presence of leaks 10 and/or 11 from the high pressure hose 5. The pump outlet valve 7 serves to stop the leaks 10 and/or 11 by cutting off the flow of water to the high pressure hose 5.

The water leakage scenario described above is helpful in understanding the functioning of the present invention for the protection against shocks and burns due to electrical current leakage in an electrical appliance. The key feature of this invention is that electrical current in the load is intentionally blocked from flowing during a portion of each cycle. During this portion of each cycle when current flow to the load is inhibited, if a electrically conductive path other than the load is present between the hot wire and the neutral wire or if any electrically conductive path is present between the hot wire and ground, then electrical current will flow out of the plug even though current is blocked from flowing through the load. This represents a fault condition and is sensed at the plug which then opens a circuit breaker to substantially remove current supplied from the plug, either to the load or to the fault.

Figure 2:
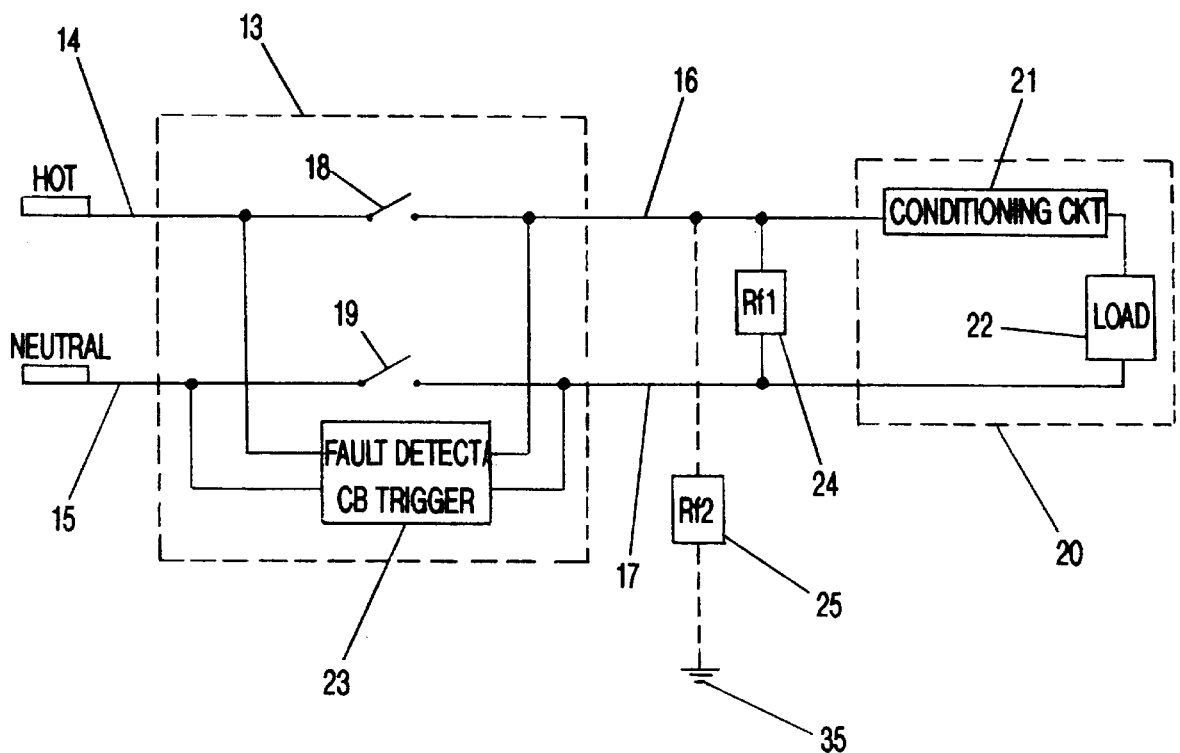
FIG. 2 is a block diagram of the invention, illustrating the approximate connections of fault sensing circuitry, circuit breaker and load conditioning circuit within the plug/cord/appliance unit.

FIG. 2 depicts a block diagram of this approach to fault detection/protection. The plug 13 connects to the hot 14 and neutral 15 prongs. The hot 14 and neutral 15 prongs are the blades of metal seen on any conventional extension cord or electrical appliance plug. The plug 13 also connects to the hot side 16 of the line cord and neutral side 17 of the line cord. Circuit breakers 18 and 19 are located between the prongs 14,15 and the line cord 16,17 and are used to allow (when closed) or interrupt (when open) the current flow to the conditioned load 20. The circuit breaker 19 on the neutral side will be optional for many applications and in these cases the neutral prong 15 will connect directly to the neutral wire 17.

The conditioned load is depicted in the dotted box 20 and consists of a load conditioning circuit 21 in electrical series with the load 22 so that the same electrical current flows in both. The load 22 represents any conventional electrical appliance load and could be, for example, a hair dryer, an aquarium heater, a curling iron, or a string of lights. The load conditioning circuit 21 serves to interrupt the current flow to the load during part of each cycle of AC current. A fault detect/circuit breaker trigger 23 in the plug 13 monitors the electrical current that is flowing out of the plug 13 and into line cord wires 16,17. If, during the time interval that the load conditioning circuit 21 is blocking the flow of electrical current to the load 22, a sense current in excess of some preset threshold is detected at the fault detect/circuit breaker trigger circuit 23, this indicates a fault condition, that is, an undesirable load 24 between hot 16 and neutral 17 or an undesirable load 25 between hot 16 and ground 35. In this case, all power coming out of the plug 13 is removed by opening circuit breakers 18 and (if present) 19. When the circuit breaker 18 is opened, no electrical current can flow through the hot conductor 16 to the hot to neutral fault 24 or the hot to ground fault 25. Accordingly, if the hot to neutral fault 24 or hot to ground fault 25 represents a human body making accidental contact with dangerous voltages within the applicance, then this invention will protect against electrical injury by detecting this fault condition and rapidly removing power at the plug.

An analogy may be drawn between FIG. 1 and FIG. 2. The voltage at the hot prong 14 of the electrical circuit in FIG. 2 corresponds to the high pressure flow at the outlet of the pump 3 in FIG. 1. The circuit breaker 18 corresponds to the pump outlet valve 7. The fault detect/circuit 23 corresponds to the flowmeter 6. The hot conductor 16 connecting plug 13 and conditioned load 20 corresponds to the high pressure hose 5. The load conditioning circuit 21 corresponds to the filter intake valve 8. The load 22 corresponds to the filter 2. The neutral conductor 17 corresponds to the low pressure hose 9. The hot to ground fault 25 corresponds to a leak 10 from the high pressure hose 5 to the aquarium 1. The hot to neutral fault 24 corresponds to a leak 11 from the high pressure hose 5 to the low pressure hose 9.

Figure 3:
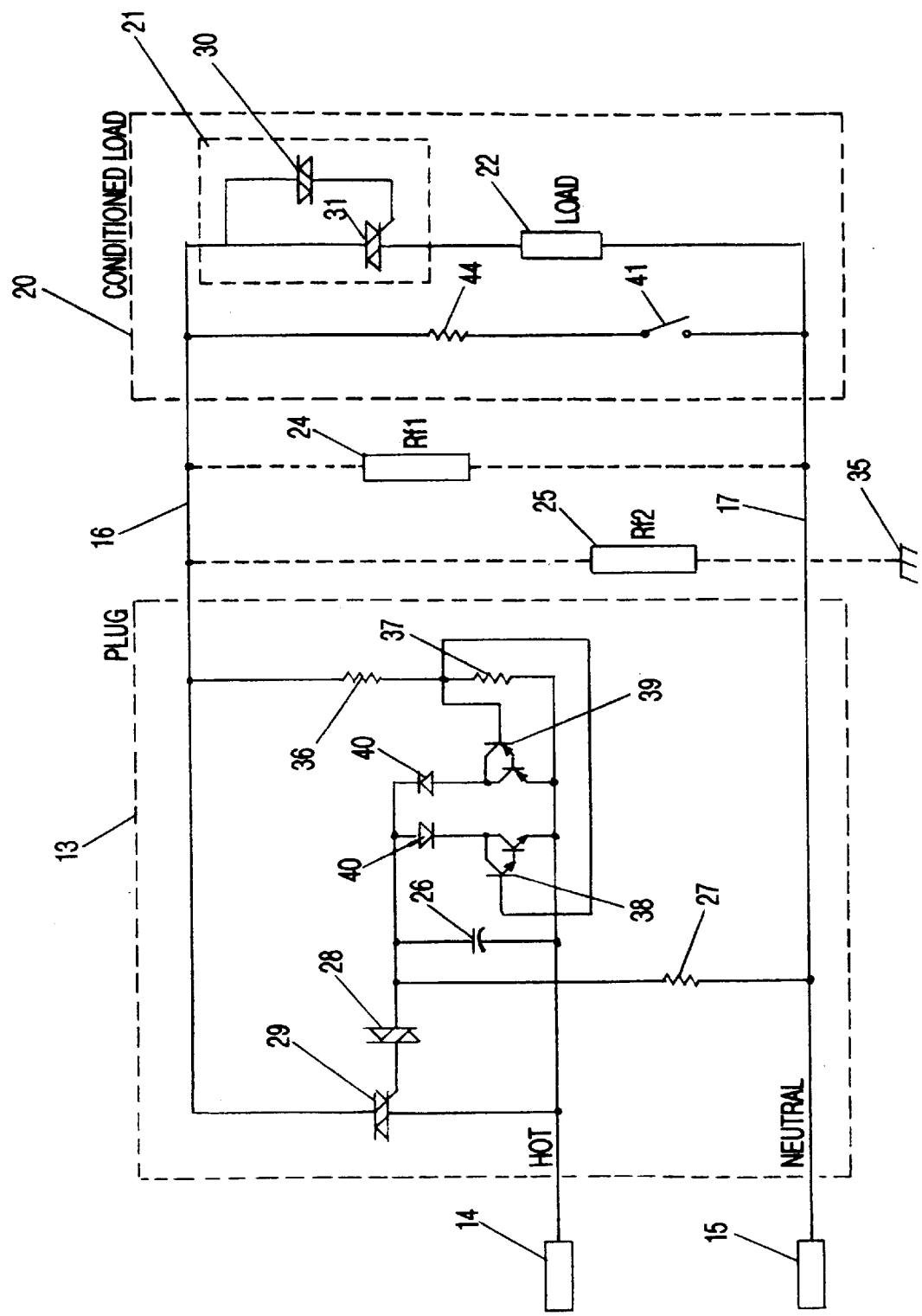
FIG. 3 is an electrical schematic of the first embodiment of this invention as used in full wave operation.
Figure 4:
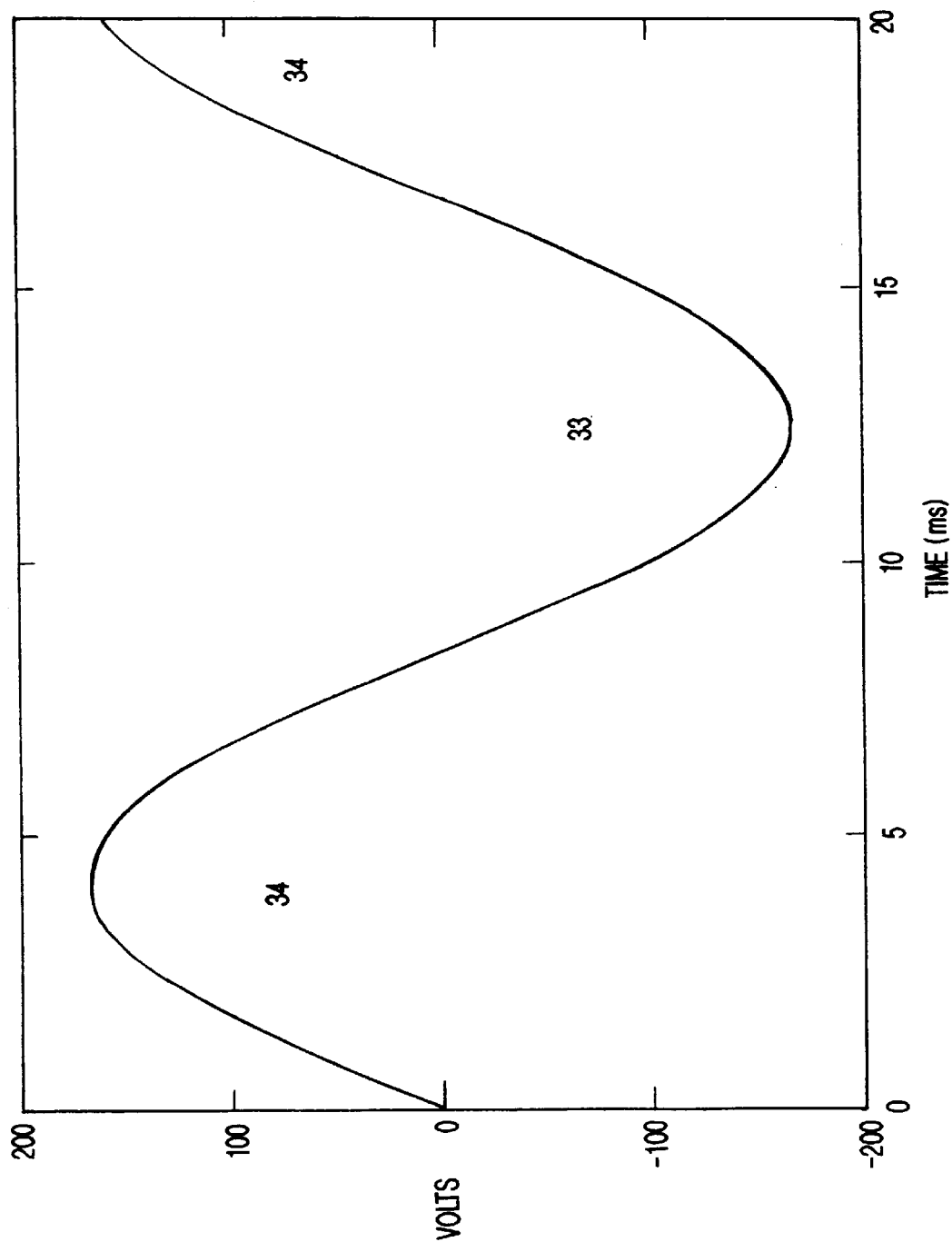
FIG. 4 is a sketch of the voltage applied at the plug between the hot and neutral conductors.
Figure 5:
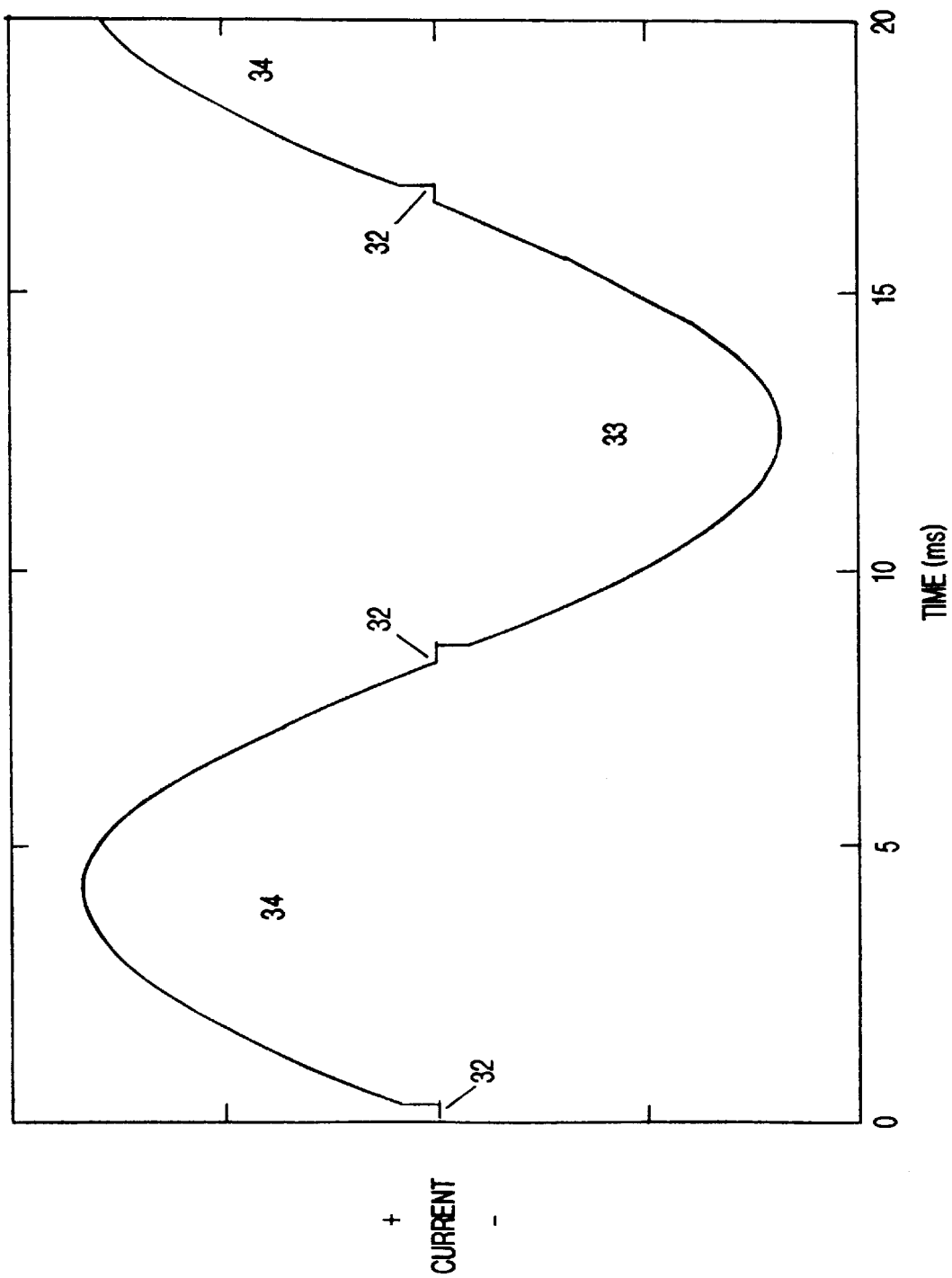
FIG. 5 is a sketch of the current delivered to the load in the absence of a fault.

The first preferred embodiment is shown in FIG. 3. The power applied to the plug prongs 14 and 15 is sinusoidal alternating (AC) current. FIG. 4 depicts over one full cycle of this AC voltage at the hot prong 14 relative to the neutral prong 15. The negative half cycle 33 is defined as the time interval during each cycle of AC when the voltage at the hot prong 14 has a value less than that of the neutral prong 15. For example, FIG. 4 depicts a waveform corresponding to 60 cycles per second (a period of 16.66 milliseconds). In FIG. 4, the first 8.33 milliseconds corresponds to the positive half cycle 34 while the interval of 8.33 milliseconds to 16.66 milliseconds corresponds to a negative half cycle 33. This then repeats. In the absence of a fault, during the negative half cycle 33 a charge storage capacitor 26 in the plug 13 is positively charged through resistor 27. When it exceeds the diac 28 turn-on voltage, the diac 28 fires, triggering triac 29. Triac 29 then turns on and allows electrical current to flow out of the plug 13 and to the conditioned load 20 through the hot wire 16. In this embodiment, the conditioning circuit 21 consists of a diac 30 which is used to trigger a load triac 31. During the portion of the AC cycle in which the magnitude of the voltage between conductors 16 and 17 is less than the diac 30 trigger voltage, the load triac 31 will be inhibited from conducting and no electrical current will be delivered to the load 22 through the load triac 31. FIG. 5 depicts the electrical current delivered to the load 22 in the absence of a fault. The intervals 32 are the times during which the current is blocked from flowing in the load 22. During these intervals, a small current may still flow out of the plug through the series connection of resistors 36 and 37 if an unintentional load 24 (a hot to neutral fault) is connected between the hot conductor 16 and the neutral conductor 17. In addition, current may also flow out of the plug through resistors 36 and 37 if an unintentional load 25 (a hot to ground fault) is connected between the hot conductor 16 and ground 35. Resistors 36 and 37 would typically be chosen to be of high value to minimize this sense current. If fault 24 and/or 25 is present during time interval 32 at the beginning of the negative half cycle, transistor 38 in the plug 13 will conduct through its collector diode 40 due to base current generated by the fault current flowing through a resistor divider 36,37. Transistor 38 will discharge the capacitor 26 preventing diac 28 from firing. Triac 29 will thus remain off for the rest of the negative half cycle 33. During the time interval 32, prior to the positive half cycle 34 of the input power, if fault 24 or 25 is present, transistor 39 will conduct through its collector diode 40 due to base current generated by the fault current flowing through resistor divider 36,37. Transistor 39 will discharge capacitor 26 in a similar manner as transistor 38. Because triac 29 is prevented from firing, current flow out of the plug is prevented. Triac 29 functions as a circuit breaker, preventing the flow of current to the fault 24 and/or 25.

The conducting transistor 38 or 39 will continue to keep the capacitor 26 in a discharged condition until such time as the fault 24 and/or 25 is removed. When the fault 24 and/or 25 is removed, the capacitor 26 will be allowed to charge through resistor 27. By doing so, the capacitor 26 and diac 28 will enable the power triac 29 to conduct current to the conditioned load 20 on subsequent cycles. After interval 32 the current flowing through the fault resistances 24 and/or 25 will keep transistor 38 or 39 in a conducting mode thus preventing capacitor 26 from charging and then firing diac 28 and triac 29.

When load triac 31 gets too hot, a significant leakage current will flow during time interval 32, giving the appearance of a hot to neutral fault 24 (even though a hot to neutral fault 24 may, in fact, be absent). This condition will be treated exactly as any fault would be and electrical current flowing out of the plug 13 will be interrupted until the load triac 31 cools enough to block load current flow during time interval 32.

When the appliance is immersed in a conductive fluid, creating a hot to neutral fault 24 or hot to ground fault 25, this fault condition will be sensed and current flow from the plug 13 will be interrupted. In this way, immersion protection is provided by this invention.

An optional switch 41 may be built into the plug 13 or the conditioned load 20 to control appliance power and/or to serve as a test for the correct functioning of the fault protection circuitry. When the switch 41 is closed, a fault condition is induced through the intentional fault resistor 44, thus causing the triac 29 to cease conducting and thereby removing power from the appliance at the plug 13. When the switch 41 is later opened, the fault condition is removed and, in the absence of additional faults, electrical current is allowed to flow to the load. The advantage to using the switch 41 for controlling power is that the switch need not be sized to interrupt the possibly high level appliance current but need only be sized large enough to handle a low level fault current. The switch 41 may also be implemented as a button to test for the proper functioning of the fault protection circuitry by inducing a momentary fault.

Figure 6:
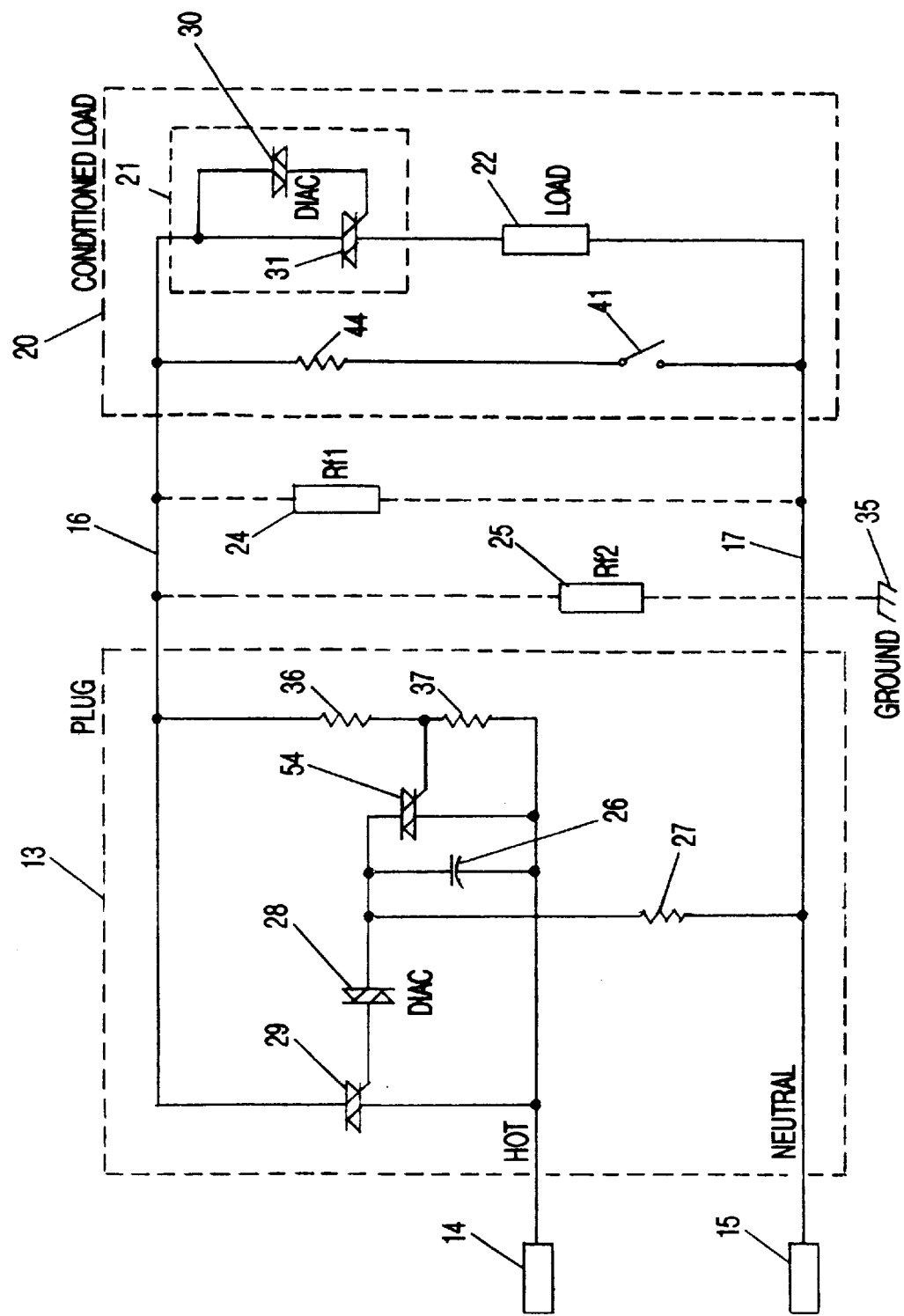
FIG. 6 is an electrical schematic of a second embodiment of this invention as used in full wave operation.

A second preferred embodiment is shown in FIG. 6. Its function is nearly identical to that of the first preferred embodiment in FIG. 3 except that the transistors 38,39 and diodes 40 are replaced by a sensitive gate triac 54. The sensitive gate triac 54 can be triggered by a positive gate current or a negative gate current. When triac 54 is triggered, it will keep capacitor 26 discharged for the remainder of the half cycle, thereby preventing diac 28 from firing, thus preventing triac 29 from conducting current out of the plug 13.

Figure 7:
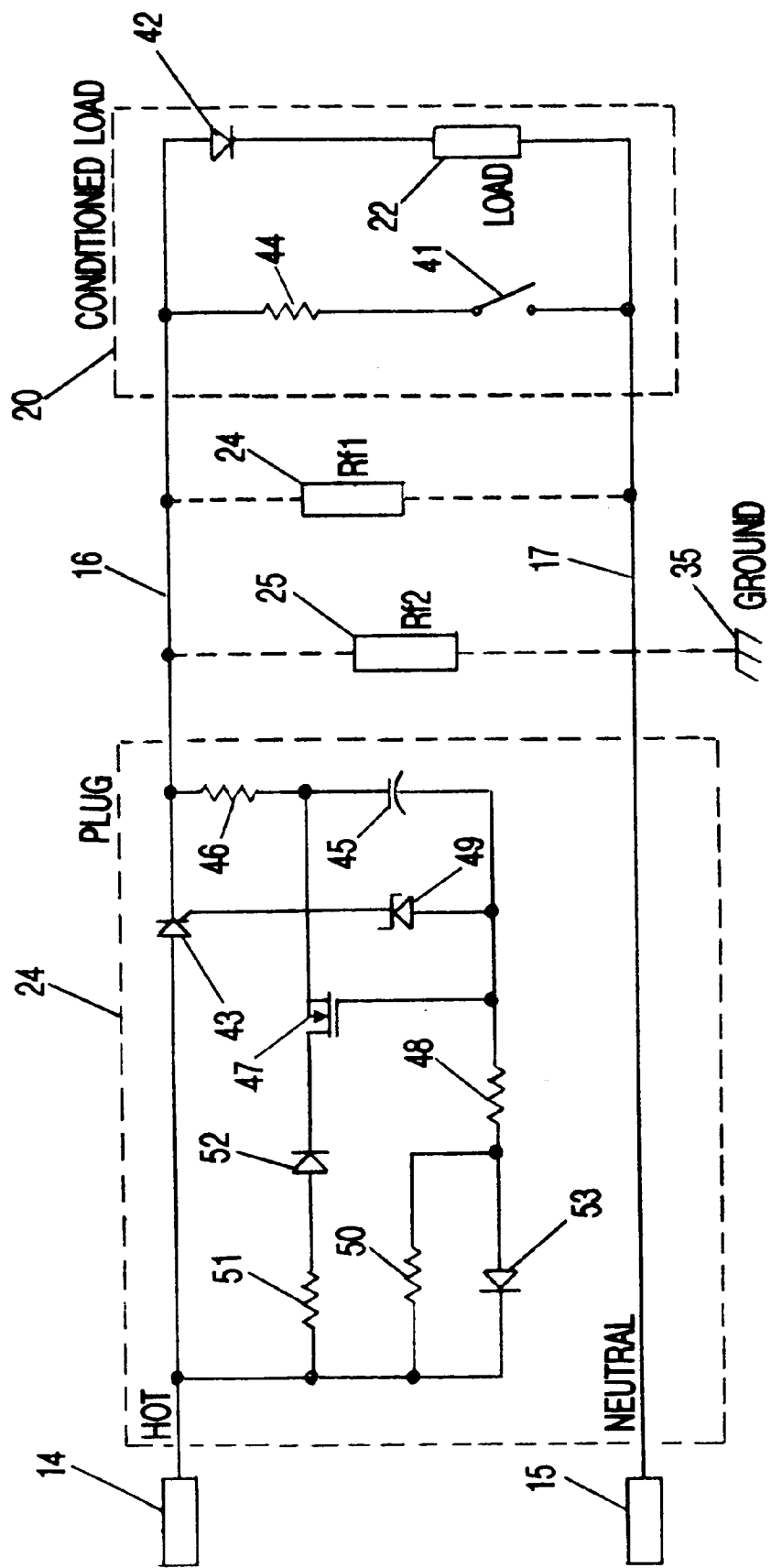
FIG. 7 is an electrical schematic of a third embodiment of this invention as used in half wave operation.

A third preferred embodiment is shown in FIG. 7. This circuit is designed for loads that operate under half wave AC. The conditioned load 20 consists of a diode 42 in series with the load 22. The diode 42 acts as a conditioning circuit (corresponding to 21 in FIG. 2) by inhibiting the flow of current to the load 22 during the negative half cycle 33. In the absence of a fault, during the negative half cycle 33, diode 42 prevents current flow in the load 22. Capacitor 45 will not be charged because no current flows through the load 22. If a hot to neutral fault 24 or hot to ground fault 25 were present then capacitor 45 would charge from neutral through the faults 24 and/or 25, and resistors 46 and 48, and diode 53 to the hot conductor 16. The net charge would be negative on the gate of transistor 47.

During the positive half cycle 34, if capacitor 45 has a negative charge on the gate of transistor 47 (meaning a fault was detected) then the transistor 47 will be depleted and cannot conduct. If during the positive half cycle 34 the capacitor 45 has no charge or has a positive charge then transistor 47 will conduct current through resistor 51 and diode 52 to the gate of the silicon controlled rectifier 43, diode 42 and load 22. This results in the firing of silicon controlled rectifier 43 causing it to conduct current from the hot terminal 14 to the hot conductor 16 for the remainder of the positive half cycle 34. If the capacitor 45 had a net negative charge during the positive half cycle 34, then capacitor 45 would slowly be reverse charged through resistors 50, 48, 46, the load diode 42 and the load 22. Resistor 50 is intentionally chosen to be of high resistance so that reverse charging capacitor 45 will require substantially longer than ½ cycle. This prevents the circuit from quickly recovering from a fault. During the positive half cycles when the silicon controlled rectifier 43 is fired and has a small voltage drop, capacitor 45 will tend to stay discharged or charged slightly positive through resistors 50, 48 and 46. Zener diode 49 serves to protect the gate of the transistor 47 from excessive charge voltage on capacitor 45 and may be internal to the transistor 47.

When load diode 42 gets too hot, a significant leakage current will flow during time interval 33, giving the appearance of a hot to neutral fault 24 (even though a hot to neutral fault 24 may, in fact, be absent). This condition will be treated exactly as a fault would be and electrical current flowing out of the plug 13 will be interrupted until the load diode 42 cools enough to block load current flow in the reverse direction.

When the appliance is immersed in a conductive fluid, creating a hot to neutral fault 24 or a hot to ground fault 25, this fault condition will be sensed and current flow from the plug 13 will be interrupted. In this way, immersion protection is provided by the invention.

An optional switch 41 may be built into the load 20 to control appliance power and/or to serve as a test for the correct functioning of the fault protection circuitry. When the switch is closed, a fault condition is induced through the intentional fault resistor 44, thus causing the SCR 43 to cease conducting and thereby removing power from the appliance. When the switch 41 is later opened, the fault condition is removed and, in the absence of additional faults, electrical current is allowed to flow to the load. The advantage to using the switch 41 for controlling power is that the switch need not be sized to interrupt the possible high level appliance current but need only be sized large enough to handle a low level fault current. The switch 41 could be implemented as a button to test for the proper functioning of the fault protection circuitry by inducing a momentary fault. Optionally, the switch 41 and resistor 44 could be located in the plug 13, thus serving as a test button or as a low current on/off, or could be connected between the hot and neutral conductors.

Figure 8:
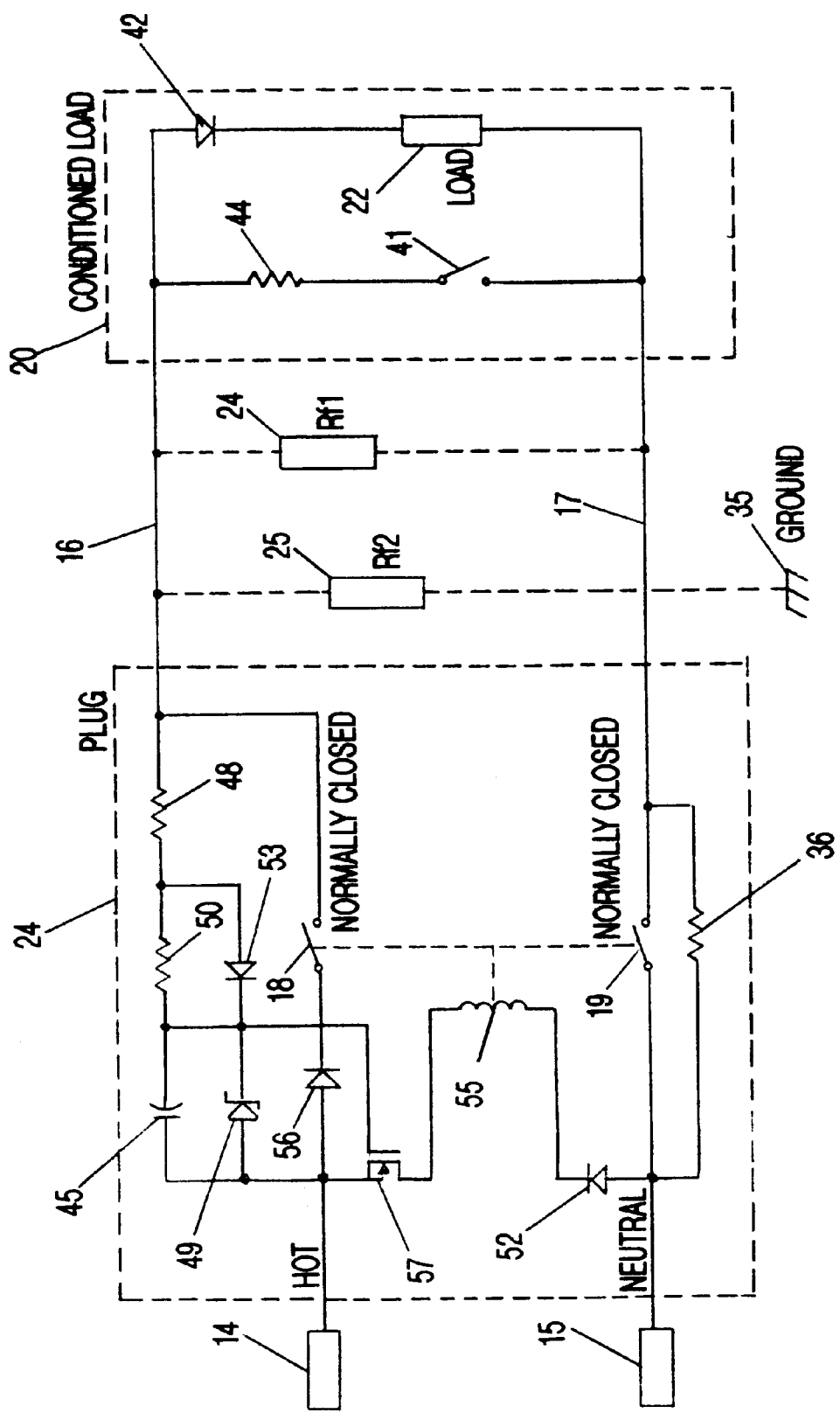
FIG. 8 is an electrical schematic of a fourth embodiment of this invention as used in half wave operation and using a mechanical relay in the plug.

A fourth embodiment of the invention is shown in FIG. 8. This embodiment is for use with a mechanical relay and is designed for half wave operation. Under normal operation in the absence of a hot to neutral fault 24 or a hot to ground fault 25, half wave AC power is provided to the load 22 during the positive half cycle 34. The current path is from the hot prong 14 through diode 56, the normally closed contact 18 to the hot conductor 16, load conditioning diode 42, the load 22, and back through the neutral conductor 17 and the optional normally closed contact 19 to the neutral prong 15. During the negative half cycle 33, current is blocked from flowing into the load by diode 42, and power diode 56. Capacitor 45 will remain uncharged unless a hot to neutral fault 24 or hot to ground fault 25 is present.

During the negative half cycle 33, if a fault 24 or 25 is present, capacitor 45 will charge through the fault resistance 24 and/or 25, resistor 48, and diode 53. Gate protection zener diode 49 limits the voltage on capacitor 45 and protects the MOSFET transistor 57. When the voltage on capacitor 45 exceeds a predetermined threshold, transistor 57 will become enhanced and conduct. Relay coil 55 will be energized through diode 52 and conducting transistor 57 thus opening both contacts 18 and 19 and interrupting current to the load and faults. In this way fault protection is provided. The relay coil is self-resetting. It is energized on half wave AC, and will keep its contacts 18 and 19 open through the completion of the full cycle because of residual magnetic field. Resistor 36 is of high resistance and is necessary to allow a small sense current around open contact 19 and may be omitted if contact 19 is not used. For each negative half cycle 33 that fault 24 or 25 exists, the charge on capacitor 45 will be maintained. During all positive half cycles 34 capacitor 45 is discharged through resistors 50, 48, diode 42 and the load 22. Resistor 50 is of large value so that discharging capacitor 45 will require significantly longer than one half cycle.

What is claimed is:

1. An electrical shock protection apparatus for electrical appliances having a plug, a load and requiring no more than two current carrying conductors connecting said plug to said load, said apparatus comprising:
    means for bidirectionally blocking electrical current flow to the load for predetermined time intervals;
    means for detecting current in said current carrying conductors; and
    means for interrupting said current in said current carrying conductors, thereby preventing electrical shocks, if current in said conductors exceeds a predetermined threshold value during said predetermined time intervals.

2. The electrical shock protection apparatus of claim 1 wherein said electrical current interruption means is disposed within said plug.

3. The electrical shock protection apparatus of claim 2 wherein exactly two electrical conductors connect the plug to the load.

4. The electrical shock protection apparatus of claim 3 wherein said load is powered by full wave AC current and said two electrical conductors deliver substantially full wave AC current to the load.

5. The electrical shock protection apparatus of claim 1 wherein there are exactly two current carrying conductors and a third ground conductor which does not conduct electrical current during normal operation.

6. The electrical shock protection apparatus of claim 1 wherein said electrical current blocking means is a non-linear circuit element.

7. The electrical shock protection apparatus of claim 6 wherein said electrical current blocking means prevents current flow when the magnitude of the voltage across the two or more electrical conductors is below a predetermined threshold.

8. The electrical shock protection apparatus of claim 6 wherein said electrical current blocking means prevents current flow when the magnitude of the voltage across said electrical current blocking means is below a predetermined threshold.

9. The electrical shock protection apparatus of claim 6 wherein said electrical current blocking means is selected from the group consisting of a relay, a transistor, a diode, and a thyrister.

10. The electrical shock protection apparatus of claim 6 wherein the electrical current blocking means consists of a triac with a diac connected between the gate of the triac and a terminal of the triac.

11. The electrical shock protection apparatus of claim 6 wherein the electrical current blocking means consists of series inverse connected zener diodes.

12. The electrical shock protection apparatus of claim 6 wherein the electrical current blocking means is electrically in series with the load.

13. The electrical shock protection apparatus of claim 1 wherein said means for interrupting current is selected from a group consisting of mechanical relays, transistors, and thyristors.

14. The electrical shock protection apparatus of claim 1 wherein an artificial fault may be induced to turn the appliance on and off and to test correct functioning of said apparatus.

15. The electrical shock protection apparatus of claim 1 wherein said electrical current blocking means is shorted and does not fully interrupt current flow to the load, and thereby simulating a fault condition, when the load is immersed in a conductive fluid.

16. The electrical shock protection apparatus of claim 1 wherein said electrical current detecting means comprises a charge storage capacitor that is prevented from charging if current flow through the plug exceeds said predetermined threshold during the time intervals in which current is blocked from flowing into the load, thereby keeping the current interrupting means in an open circuited or interrupting condition.

17. The electrical shock protection apparatus of claim 16 wherein said electrical current detecting means further comprises a transistor that conducts to discharge said charge storage capacitor if current flow out of the plug exceeds said predetermined threshold during the predetermined time intervals in which current is blocked from flowing into the load.

18. The electrical shock protection apparatus of claim 16 wherein said electrical current detecting means further comprises a thyristor that conducts to discharge said charge storage capacitor if current flow out of the plug exceeds said predetermined threshold during the predetermined time intervals in which current is blocked from flowing into the load.

19. A method of providing shock protection for appliances having a plug and a load and requiring no more than two current carrying conductors connecting said plug to said load, the method comprising the steps of:
    a) bidirectionally blocking current to the load for predetermined time intervals;
    b) detecting current in said current carrying conductors; and
    c) interrupting the current flow in said current carrying conductors if the current in the conductors exceeds a predetermined threshold during the predetermined time intervals.

20. The method of claim 19 wherein the interrupting step is performed by a current interrupting means disposed within the plug.

21. The method of claim 19 wherein the blocking step is performed by a non-linear circuit element.

22. The method of claim 19 wherein the step of blocking current to the load further comprises the step of blocking current to the load when the magnitude of the voltage across the current carrying conductors is below a predetermined threshold.

23. The method of claim 19 further comprising the step of providing an artificial fault to turn off the appliance.

24. The method of claim 19 further comprising the step of providing an artificial fault to test for correct function.

25. The method of claim 19 further comprising the step of controlling bidirectional blocking by means of a voltage sentitive device selected from the group consisting of diacs and diac controlled thyristors.

26. The method of claim 19 wherein exactly two electrical conductors connect the plug to the load.

27. The method of claim 19 wherein current is detected, during the predetermined time intervals, in said current carrying conductors by means of a test current.

* * * * *